Jan. 5, 1954
G. O. BIRDWELL
2,665,144
VEHICLE HITCH
Filed Aug. 30, 1951
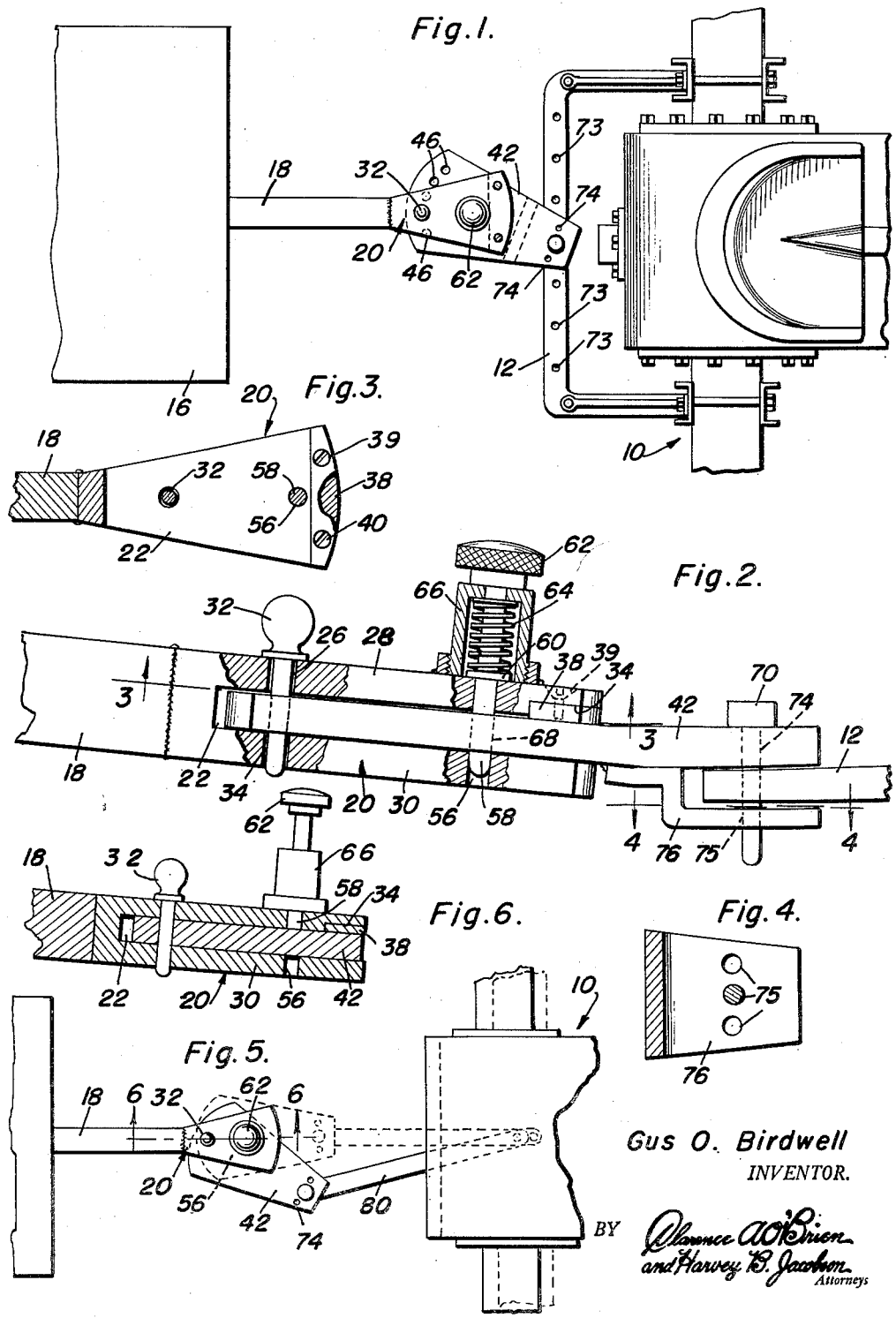
Gus O. Birdwell
INVENTOR.

Patented Jan. 5, 1954

2,665,144

UNITED STATES PATENT OFFICE 2,665,144

VEHICLE HITCH

Gus O. Birdwell, Perryton, Tex.

Application August 30, 1951, Serial No. 244,321

1 Claim. (Cl. 280—462)

This invention relates to improvements in hitches to couple vehicles together, implements to vehicles or implements to implements.

An object of this invention is to provide an improved hitch to be used for coupling a trailing implement, vehicle or other movable device to a towing one, the hitch including a bifurcated element at the end of a tongue, which bifurcated element is provided with a pivoted plate having provision therein to be locked in one of a number of positions, together with a wear resistant element preventing direct contact of the plate with the bifurcated member.

Ancillary objects and features of importance will become apparent to those skilled in the art in following the description of the illustrated form of the invention.

In the drawings:

Figure 1 is a fragmentary plan view of a trailing vehicle, whether it be an implement, wagon or other type of implement connected by my improved hitch with a towing vehicle having a rigid drawbar;

Figure 2 is an enlarged elevational view of the hitch, parts being shown in section to illustrate in general detail;

Figure 3 is a sectional view taken on a line 3—3 of Figure 2 drawn to a smaller scale;

Figure 4 is a sectional view taken on a line 4—4 of Figure 2 and in the direction of the arrows;

Figure 5 is a fragmentary plan view of an implement connected by my improved hitch to a tractor having a pivoted drawbar, and Figure 6 is an enlarged longitudinal sectional view taken on the line 6—6 of Figure 5.

In the accompanying drawings I have illustrated a fragmentary part of a tractor 10 having a rigid drawbar 12 of standard description fixed thereto. There is an implement 16 fragmentarily and schematically shown, which implement may be of any known type, the word "implement" as used herein indicating a farm implement, wagon, or other towed element. There is a draft 18 conventionally connected with the implement 16, the draft being provided at its forward end with a bifurcated member 20 which is made by providing a slot 22 in a block, the slot opening through the front end thereof.

The bifurcated member has outwardly flared sides for rigidity and strength of construction and also to provide ample stock for attachment of various elements. There is a substantially vertical passage 26 in the furcations 28 and 30 of the member 20 and it accommodates a pivot pin 32 which has an enlarged head to prevent it from falling completely through the passage 26.

There is a recess or relieved section 34 in the upper furcation 28 which communicates with the outer end of the slot 22. A bearing 36 is fastened in the recess 34 by standard means, as the screws 39 and 40 and the purpose of the bearing is to prevent direct metal to metal contact of the tongue 42 with the bottom surface of the upper furcation 28. It is preferable that the bearing member be made of wood or some other material softer than the metal of the block and tongue 42.

Inasmuch as the pin 32 is passed through an aperture in the tongue 42, the tongue is capable of being pivoted to various positions within the bifurcated member 20. When pivoted to the desired position, the pin 32 is inserted in the passage 26. In this regard there is a plurality of apertures 46 provided in the tongue 42, one of which serves as the recipient of the pin 32 whereby the tongue 42 may be held at any desired angle with respect to the longitudinal axis of the draft 18.

There is a second passageway 56 through the furcations 28 and 30 to accommodate the spring loaded pin 58. This spring loaded pin is provided with a collar 60 intermediate the knob at its upper end 62 and the lower end thereof, upon which the spring 64 seats. This spring bears against the top part of a small casing 66 which is fastened to the slotted member 20 thereby constantly yieldingly pressing the pin 58 inwardly of the passage 56 and through an aperture 68 provided in the tongue 42.

A hitch pin 70 is used to connect the tongue 42 with the tractor drawbar 12, being passed through one of the standard openings 73 in the drawbar, an aperture 74 in the tongue 42 and also an aperture 75, which is one of a plurality of them in the bracket 76 which is secured at one end to the tongue 42 and which is adapted to underlie the drawbar 12. The aperture 74 is also one of a group whereby the coupling pin 70 may be fastened to the tongue in one of a number of positions.

In operation the coupling pin 70 is passed through aligned apertures 74 and 75. Accordingly this leaves the end of the tongue projected at a slight incline inasmuch as it is bent upwardly at a point intermediate its ends. At this time the tongue 42 being fitted in the slot 22 is located so that the pin 32 may be passed through one of the plurality of apertures 46 and also through the passage 26 to obtain the desired angular relationship between the longitudinal axis of the draft 18 and the tongue 42. The spring loaded pin 56 is retained in the aperture 68 at this time, to be lifted therefrom to allow the draft 18 to be pivotal about the pin 32 as a vertical axis.

In Figure 5 I have illustrated my hitch as coupling the implement 16 to a swingable drawbar 80 pivoted to the tractor 10 as at 81. As illustrated in Figure 5 in full lines the tractor 10 with a pivoted drawbar 80 need not be backed into precise coupling position forwardly of the hitch but with the pin 58 retracted to ride on the tongue 42, as shown in Figure 6, said tongue and the drawbar 80 may be swung into angular relation for coupling the drawbar 80 to the tongue 42 by means of the hitch pin 70. Then when the tractor 10 is driven forwardly the tongue 42 and drawbar 80 will be swung into alignment and the pin 58 will snap, under the influence of the spring 64, into the apertures 68 and 56 and lock the tongue 42 to the member 20.

Having described the invention, what is claimed as new is:

A hitch for coupling a trailer to a tractor comprising a transverse drawbar on the tractor, a bifurcated member rigidly attached horizontally to said trailer and having a vertical opening therein, a tongue fitting in said member, means on one end of the tongue and on said drawbar for pivotally connecting said tongue to said drawbar at selected positions along the same for horizontal swinging into different angular positions relative to said member in offset relation to the longitudinal center of the tractor, said tongue having a series of vertical openings in the other end thereof registering respectively with the opening in said member in the different angular positions of the tongue, a pivot pin for insertion in the opening in said member and the opening in the tongue registering therewith in the different angular positions of the tongue and on which said tongue tends to swing out of said angular positions under pull of the tractor, and coacting snap action devices on said member and tongue for locking said tongue to said member against swinging out of said angular positions.

GUS O. BIRDWELL.

References Cited in the file of this patent

UNITED STATES PATENTS

| Number | Name | Date |
| --- | --- | --- |
| 1,408,501 | Clement | Mar. 7, 1922 |
| 2,138,512 | Rogers | Nov. 29, 1938 |
| 2,512,836 | Olson | June 27, 1950 |

FOREIGN PATENTS

| Number | Country | Date |
| --- | --- | --- |
| 213,580 | Switzerland | May 16, 1941 |